United States Patent [19]

Platt

[11] Patent Number: 5,421,009

[45] Date of Patent: May 30, 1995

[54] METHOD OF REMOTELY INSTALLING SOFTWARE DIRECTLY FROM A CENTRAL COMPUTER

[75] Inventor: Stephen M. Platt, Ft. Collins, Colo.

[73] Assignee: Hewlett-Packard Company, Palo Alto, Calif.

[21] Appl. No.: 171,498

[22] Filed: Dec. 22, 1993

[51] Int. Cl.⁶ ............................................. G06F 13/00
[52] U.S. Cl. .................... 395/600; 395/200; 395/650; 364/DIG. 1
[58] Field of Search ................ 395/600, 650, 200

[56] References Cited

U.S. PATENT DOCUMENTS 5,155,847 10/1992 Kirouac et al. ................ 395/600

Primary Examiner—Thomas G. Black
Assistant Examiner—Peter Y. Wang

[57] ABSTRACT

A method for remote installation of software over a computer network allows a user to interactively select each remote computer system for software installation, or to provide a file containing a list of all remote computer systems. Before attempting to install the software, the method ensures that the remote system can be reached through the network, that the remote system has the capability of running processes remotely, that the remote system has all the commands necessary to perform the installation, that the remote system has the correct hardware and software to support the installation, and that sufficient disk space exists on the remote computer system for the installation. The method then combines all files that are being remotely installed into a single data stream, sends this single data stream over the network to the remote computer system, and separates the data stream into the original files on the remote system.

16 Claims, 7 Drawing Sheets

METHOD OF REMOTELY INSTALLING SOFTWARE DIRECTLY FROM A CENTRAL COMPUTER

FIELD OF THE INVENTION

This invention relates to computer systems and more particularly to software installation within computer systems. Even more particularly, the invention relates to remotely installing software on a computer system.

BACKGROUND OF THE INVENTION

When software utilizing a client-server architecture is being distributed to customers, the server portion of the software is installed on a server computer system, and the client portion of the software is typically installed on each client computer system attached to the network. The installation of the server portion of the software is routine, since usually there is only one, or a very few, server computer systems. Installation of the client portion of the software is considerably more difficult.

Often there are many client computer systems, sometimes hundreds, and the client portion of the software must be installed individually on each machine. One prior art method of accomplishing this installation is for an installer to manually take the software distribution media to each client machine and individually install from the media onto that machine. A more efficient method is to first install the client portion of the software on the server machine, and then an installer goes to each individual client machine, logs on to the machine, and manually enters the commands necessary to copy and install the software, from the network server, onto the client machine.

Another prior art method is to manually place a download program on the server and client machines, then the download program can be used to automatically install other client-server software over a network connecting the server and client machines. This method has the disadvantage that the download program must first be manually installed on all the client machines, which requires considerable effort when a large number of client machines are being served.

All these methods, however, require considerable time to perform the installation, either of the client server software or the download program, particularly where a large number of client computer systems are involved. There is need in the art then for a way of installing the client portion of client server software onto client machines without requiring that the software or a download program be manually copied to each client computer system. The present invention solves this and other needs in the art.

SUMMARY OF THE INVENTION

It is an aspect of the present invention to provide a method of remotely installing software or data files over a network onto a remote computer system.

Another aspect of the invention is to remotely install software without first installing a download program on the client computer system.

It is another aspect of the invention to ensure that the remote computer system has all needed facilities before the remote installation is started.

A still further aspect of the invention is to combine all files being installed into a single data stream that is sent to the remote computer system where the files are separated and installed.

The above and other aspects of the invention are accomplished in a method that allows installation of the client portion of software to be done automatically over the network from the server computer system. The method allows a user to interactively select each client computer system for software installation, or to provide a batch file containing a list of all client computer systems. This batch file allows the method to easily install software on large numbers of remote computer systems.

For each client computer system, the method first ensures that the system can be reached through the network, and then ensures that the client computer system allows the server computer system to run processes remotely. It then ensures that the remote computer system has all the standard operating system commands necessary to perform the installation. By using standard operating system commands, the system "bootstraps" the installation of the software into the remote computer system, without requiring installation of a download program in the remote computer system, thus avoiding any manual operations on the remote computer system.

After ensuring that the remote system has the necessary commands, the method then determines whether the hardware of the remote computer system is capable of supporting the remote installation. It further determines whether the operating system level of the remote computer system can support the installation, and then it determines whether sufficient disk space exists on the remote computer system for the installation.

If all the necessary standard operating system commands are available and space is sufficient, the system combines all files that are being remotely installed into a single data stream. It then sends this single data stream over the network to the remote computer system, and runs a standard operating system installation program in the remote computer system which separates the data stream into the original files, updates the files to conform to the remote computer system, and installs these files on the remote computer system.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
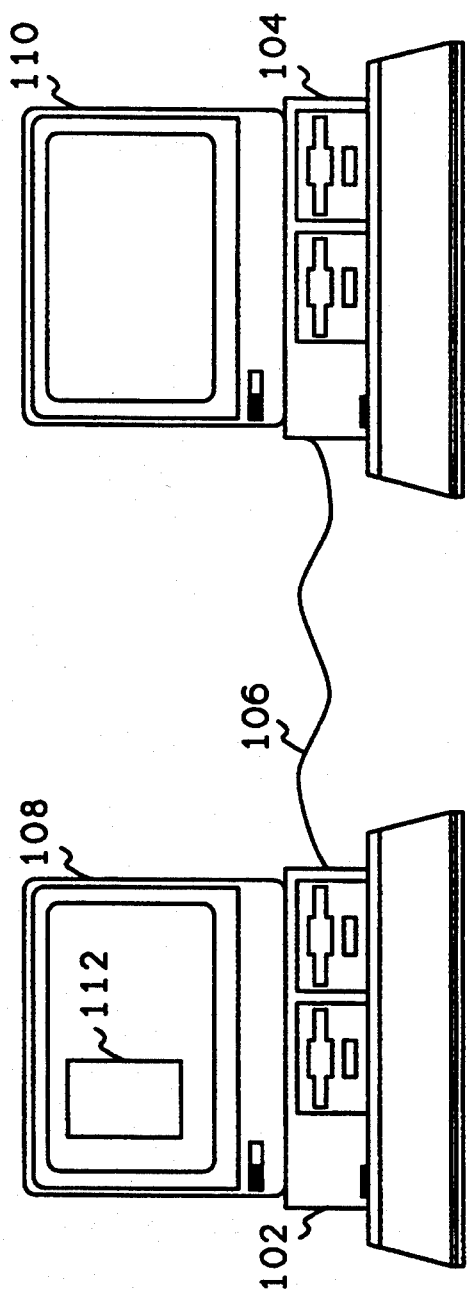
FIG. 1 shows a diagram of a local and a remote computer system connected by a computer network and illustrates the remote installation process.

FIG. 1 shows a diagram of a computer network having server and client machines. Referring now to FIG. 1, a server machine 102 has a display element 108 that contains a menu display 112. The server computer system 102 is connected to a client computer system 104 over a network 106. The network 106 is typically a local area network (LAN), but may be any type of network. The present invention comprises software running in the network computer system 102 and also in the client computer system 104 to install software from the network computer system 102 over the network 106 to the client computer system 104.

Figure 2:
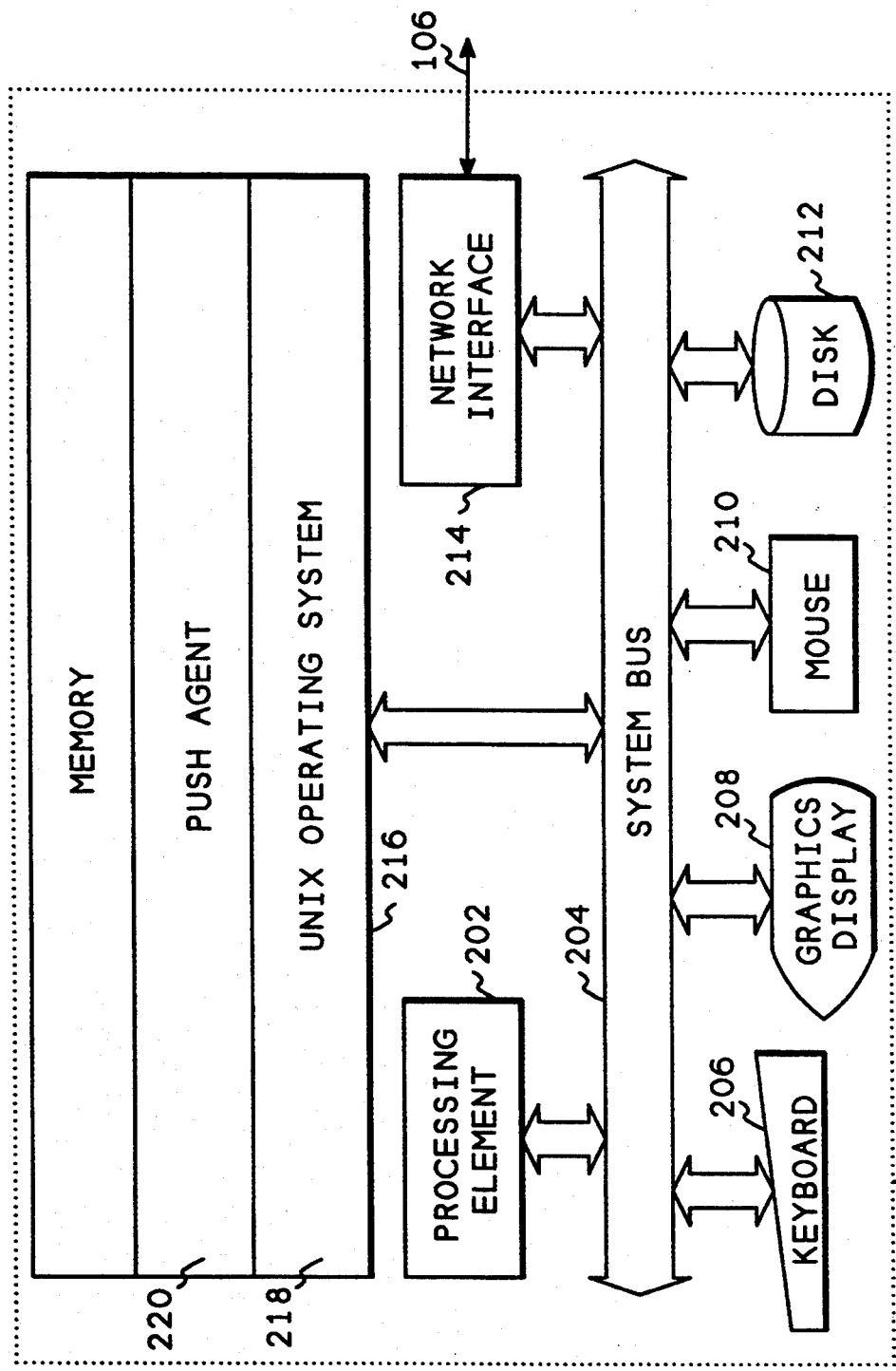
FIG. 2 shows a block diagram of the local computer system that performs the remote install.

FIG. 2 shows a block diagram of the server system 102. This same block diagram could also be applicable to the client computer system 104. Referring now to FIG. 2, the computer system 102 contains a processing element 202 which communicates to other elements of the computer system 102 over a system bus 204. A keyboard 206 allows text input to the computer system 102 and a mouse 210 allows graphical locator input to the computer system 102. A graphics display 208 provides for graphics and text output to be viewed by a user of the computer system 102 and a disk 212 stores the software and data of the present invention, as well as an operating system and other user data of the computer system 102. A network interface 214 allows the computer system 102 to transfer data and commands over the network 106 (FIG. 1).

A memory 216 contains the unix operating system 218. Those skilled in the art will recognize that other operating systems could also work with the present invention. Memory 216 also contains the push agent software 220 which comprises the present invention.

Figure 3:
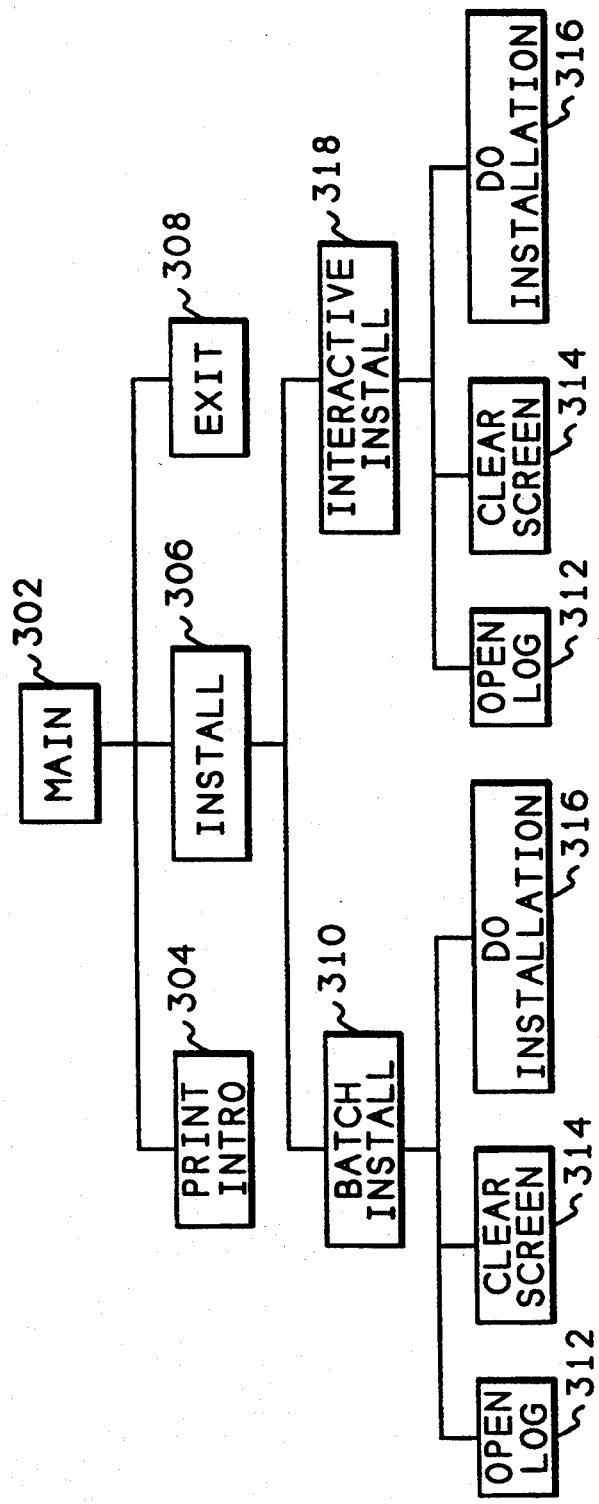
FIG. 3 shows a hierarchy chart of the software modules of the invention.

FIG. 3 illustrates a hierarchy chart which shows the modules of the present invention, and how they interconnect. Referring now to FIG. 3, main module 302 is called by the operating system 218 (FIG. 2) whenever the user requests remote installation of software. Main module 302 presents a menu to the user of the system through the graphics display 208 (FIG. 2). If the user requests help information, module 302 calls PRINT INTRO module 304 to present the help info. When the user desires to terminate the remote installation, MAIN module 302 calls exit module 308. When the user requests that remote installation be continued, module 302 calls INSTALL module 306 which presents another menu to the user to allow the user to elect batch or interactive installation. If the user elects a batch installation, INSTALL 306 calls BATCH INSTALL 310 which calls OPEN LOG 312, CLEAR SCREEN 314, and the DO INSTALLATION module 316. If the user elects an interactive install, INSTALL module 306 calls INTERACTIVE INSTALL 318 which calls OPEN LOG 312, CLEAR SCREEN 314, and the DO INSTALLATION module 316. The OPEN LOG module 312 opens the log file so that error messages can be written to the log file, and the CLEAR SCREEN module 314 clears the user's screen in preparation for displaying a menu. The functions of each of the other modules will be described below with respect to FIGS. 4-8.

Figure 4:
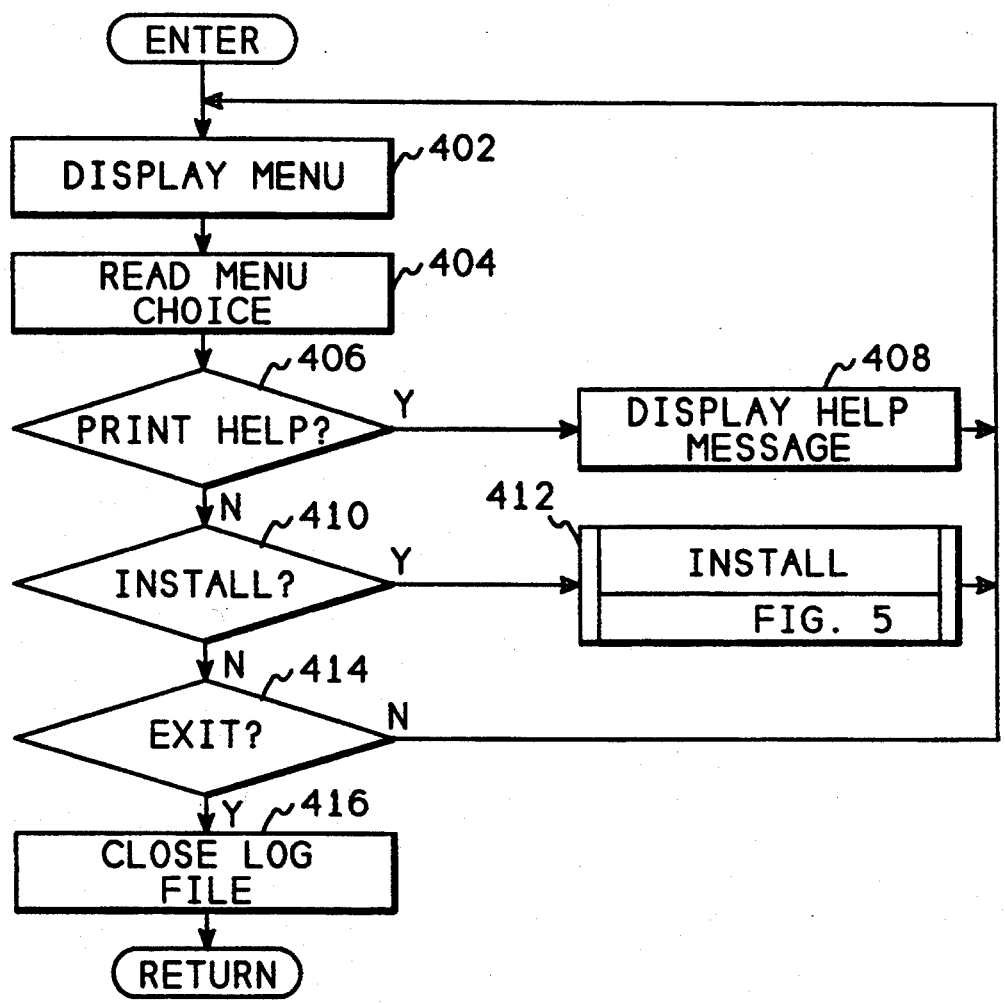
FIGS. 4-8 show flowcharts of the software modules of the invention.

FIG. 4 shows a flowchart of the MAIN module 302 (FIG. 3) which is called by the unix operating system 218 (FIG. 2) when the user requests a remote installation of software. Referring now to FIG. 4, after entry, block 402 displays a menu to the user and requests input. This menu has three options, option 1 requests an introduction, such as help information, option 2 requests an install of the software on the remote system, and option 3 requests termination of the remote software installation system. After presenting the menu, block 404 reads the menu choice from the user, and block 406 determines whether the user selected option 1 to print an introduction. If the user did select option 1, block 406 transfers to block 408 which displays a help message and then returns to block 402 to re-display the menu.

If the user did not select option 1, block 406 transfers to block 410 which determines whether the user selected option 2, to install the remote software. If user selected option 2, block 410 transfers to block 412 which calls FIG. 5 to perform the remote software installation. After performing the installation, control returns to block 402 to re-display the menu.

If the user did not select install, block 410 transfers to block 414 which determines whether the user selected the exit, option 3, and if not, block 414 transfers back to block 402 to re-display the menu. If the user did select option 3, block 414 transfers to block 416 which closes a log file, which was created during the remote software installation, and then returns to the operating system.

Figure 5:
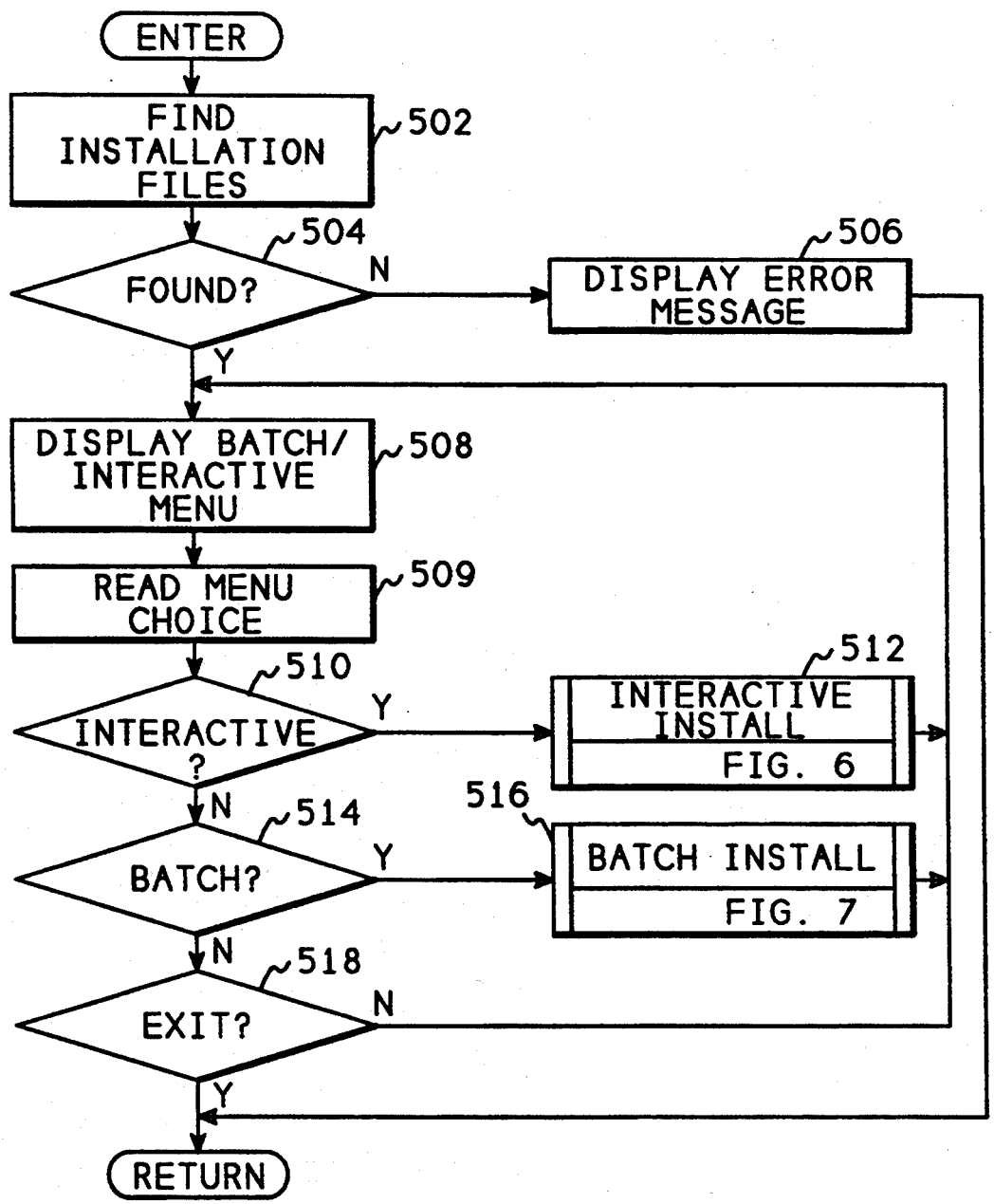

FIG. 5 shows a flowchart of the INSTALL module 306 (FIG. 3). This module is called by block 412 of FIG. 4. Referring now to FIG. 5, after entry, block 502 locates the installation files on the server system. Before the installation can proceed, the installation files must be in place on the server computer system. The present invention uses a predefined set of installation files for each set of remote software being installed. Those skilled in the art will recognize that the invention could also request that the user specify the installation files when the remote installation is started.

Block 504 then determines whether block 502 was successful in finding the installation files and if block 502 was not successful, block 504 transfers to block 506 which displays an error message to the user indicating the missing files and then returns to FIG. 4. If the files were found, block 504 transfers to block 508 which displays a menu to the user asking whether the installation should be an interactive installation or a batch installation. Block 509 reads a menu choice from the user and block 510 determines whether the user requested an interactive install. If an interactive install was requested, block 510 goes to block 512 which calls FIG. 6 to interactively perform the remote software installation and after the installation is complete block 512 returns to FIG. 4.

Figure 7:
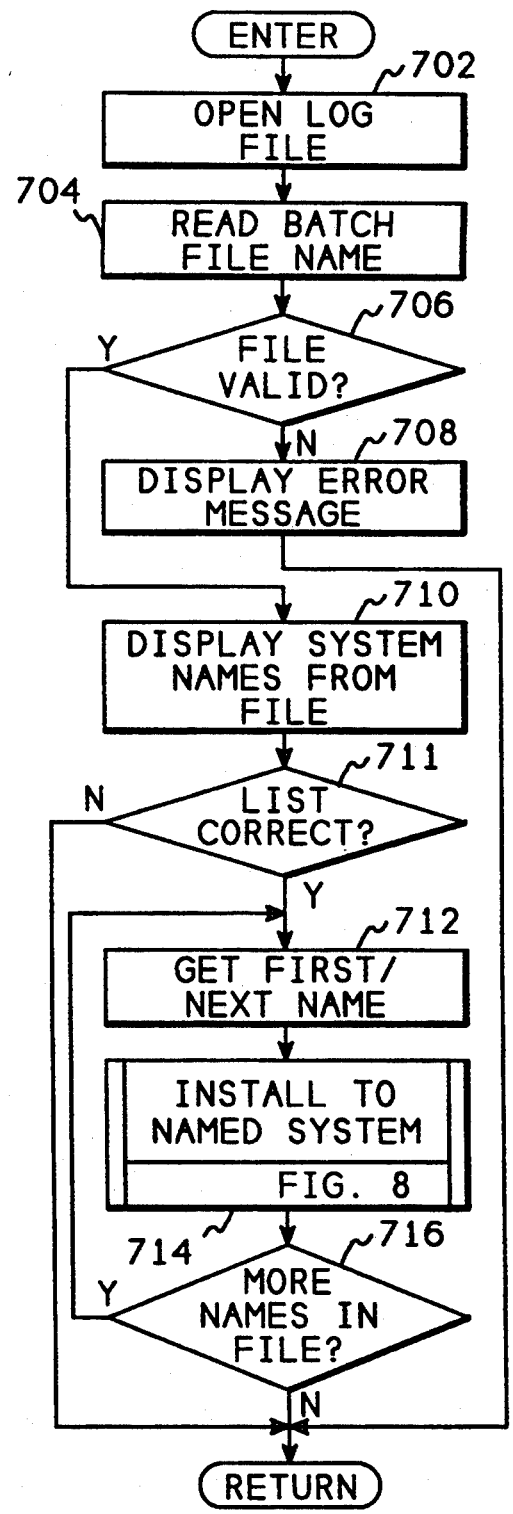

If an interactive install was not requested, block 510 goes to block 514 which determines whether the user requested a batch install and if so, block 514 transfers to block 516 which calls FIG. 7 to perform a batch install. After the batch install is complete block 516 returns to FIG. 4.

If neither type of install is requested, block 518 determines whether the user wishes to terminate the installation, and if not, block 518 returns to block 508 to re-display the menu. If the user requested termination, block 518 returns to FIG. 4.

Figure 6:
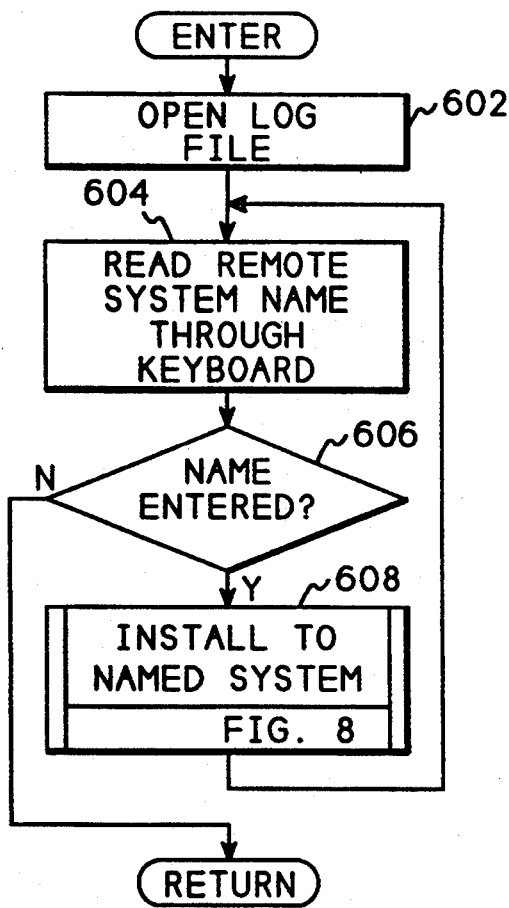

FIG. 6 shows a flowchart of the INTERACTIVE INSTALL module 318 (FIG. 3) which is called from block 512 of FIG. 5. Referring now to FIG. 6, after entry, block 602 opens a log file which is used to write information about each of the remote installations. Block 604 then displays a message requesting that the user enter the name of the next system to be installed, and block 604 reads this name through the keyboard 206

(FIG. 2). Block 606 then determines if the user entered a name and if so, transfers to block 608 which calls FIG. 8 to install the software onto the system named by the user. After the software has been installed on that system, block 608 returns to block 604 to read another system name from the user. After the user has remotely installed the software on all desired systems, no more names are entered so block 606 returns to FIG. 5.

FIG. 7 shows a flowchart of the BATCH INSTALL module 310 (FIG. 3), which is called from block 516 of FIG. 5. Referring now to FIG. 7, after entry, block 702 opens a log file in the same manner of block 602. Block 704 then displays a message requesting the name of a batch file, and then reads this name from the keyboard. A batch file is a file that contains a list of names of systems to which the software will be installed. Block 706 determines whether the file is a valid file, that is, block 706 checks the file system on the server and determines whether it can locate the file. Block 706 also removes blank lines and comments from the file and determines whether the file contains any names. If the file cannot be located, or contains no remote system names, block 706 goes to block 708 which displays an error message and then returns to FIG. 5.

If the file is valid, block 706 goes to block 710 which displays the system names found in the file on the graphics display 208 (FIG. 2), so that the user of the system knows where the software will be installed. Block 710 also asks the user to verify that the list is correct, and block 711 reads the user input and determines whether the user verified that the list is correct. If the user indicates that the list is not correct, block 711 returns to FIG. 5. If the user indicates that the list is correct, block 711 goes to block 712. Block 712 then gets the first or next name from the batch file, and block 714 calls FIG. 8 to install the software on the system identified by the name from the batch file. Block 716 then determines whether there are more names in the file, and if there are, transfers back to block 712 to get the next name from the file and install the software on that remote system. After all names have been read from the file, block 716 returns to FIG. 5.

Figure 8:
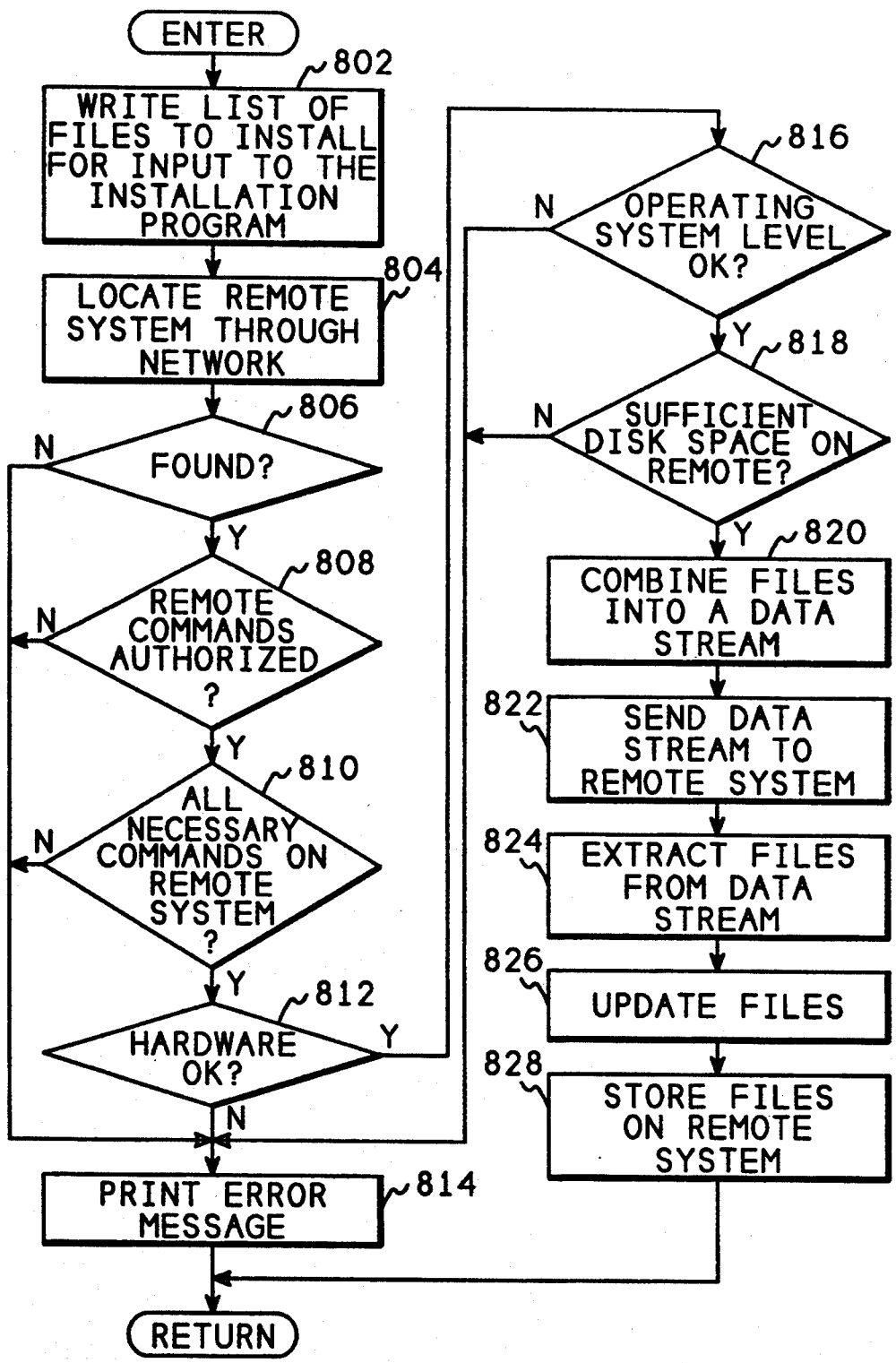

FIG. 8 shows a flowchart of the DO INSTALLATION block 316 from FIG. 3, which is called from block 608 and also from block 714 of FIGS. 6 and 7 respectively. Referring now to FIG. 8, after entry, block 802 writes a list of the files to install for input to the installation program. This list of files will be used in block 820 to combine the files into a single data stream. The file list may also include commands to cause other changes when the software is installed, such as setting file permissions or deleting existing files from the client computer system. Block 804 then sends a message through the network in an attempt to locate the client computer system where the software will be installed. Block 806 determines whether the client computer system could be found through the network, and if not, block 806 transfers to block 814 which prints an error message and then returns to its caller. The means of locating a remote system is a unix network command called "ping". This command is well known in unix systems and will not be described further. Similar commands exist in most local area network systems.

If the remote client computer system was located, block 806 transfers to block 808 which interrogates the remote system to determine whether the server computer system has authorization to execute commands on a remote shell available in the remote system. The server system must be authorized to use the remote shell in order to perform the installation. If there is no authorization, block 808 transfers to block 814 to print an error message and return to the user. If the remote shell is present, block 808 transfers to block 810 which interrogates the remote client computer system to determine whether all necessary commands are available for the installation. These commands include the "mknod" command, "bdf" command, "uname" command, "cat" command, "delete file(rm)" command, and the update command used to install the files. Each of these commands is well known to the unix user community and will not be described further. Those skilled in the art will recognize that other commonly available commands may be needed for a remote installation.

If all the above described commands are not available on the remote system, the installation cannot proceed so block 810 transfers to block 814 which displays an error message and returns. If all these commands are available, block 810 transfers to block 812 which interrogates the remote system to determine the type of hardware used in the remote system. The present invention can be limited to installing only on certain hardware, and block 812 determines whether the hardware of the client computer system is compatible. Although this type of limitation is not necessary for the present invention, it provides a method of insuring a successful installation. If the hardware is not compatible, block 812 transfers to block 814 which displays an error message and returns. If the hardware is compatible, block 812 transfers to block 816 which interrogates the remote system to determine the operating system level. In the same manner as block 812 checked the hardware and limits the installation to certain types of hardware, block 816 limits the installation to certain types and levels of operating systems. As described above this is a limitation that insures a smooth installation, but is not required by the present invention. If the operating system level is not supported, block 816 transfers to block 814 which prints an error message and returns. If the operating system level is compatible, block 816 transfers to block 818 which determines whether the remote computer system has sufficient disk space to allow for the installation. In the present invention, the amount of disk space required for installation is defined by the user of the system, however, those skilled in the art will recognize that the amount of disk space could be dynamically determined from the amount of space used by the files on the server computer system. Determining the disk space available on the client computer system is done by issuing a command through the remote shell to display the amount of disk space available in the remote system. If insufficient disk space is present on the remote system, block 818 transfers to block 814 which prints an error message and returns.

If the remote system does have sufficient disk space, block 818 transfers to block 820 which uses the file list prepared in block 802 to combine all the files being installed on the remote system into a single data stream. By combining the files into a single data stream, a considerable performance improvement is achieved over individually transferring each file to the remote system. The files are combined by concatenating the files together, and including any other installation commands necessary to correctly install the software. Optionally, the files could be compressed as well to improve performance.

After combining the files into a single data stream, block 822 sends this data stream to the remote system and block 824 runs the update program described above to extract the files from the data stream and block 826 updates the files to conform to the remote computer system. This updating includes, for example, modifying startup files so the newly installed software runs automatically when the remote computer system is started; updating security files; changing file permissions; etc.

After updating the files, block 828 stores the files on the remote system as well as performing other software installation commands, such as deleting files that are no longer used. Block 828 then returns, since the installation for this remote computer system is complete.

As a performance improvement, block 822 may send the data stream to a pipe in the remote computer system, and block 824 may read the data stream from the pipe before performing the separation. Pipes are well known methods of transferring data from one process to another within an operating system, and perform in a manner similar to a temporary file. By using the pipe, the process that receives the data stream into the remote computer system, and the process that separates the data stream into the individual files can be separate processes that run concurrently, thus improving performance.

Those skilled in the art will recognize that the method of the present invention is not limited to installing software on a client computer system from a server computer system, but could be used to install any type of files on a client computer system from a server computer system.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A programmatically performed within a central computer system, for installing software to a remote computer system through a computer network, the method comprising the steps of:
   (a) requesting a list identifying at least one remote computer system from a user of the central computer system;
   (b) selecting one previously unselected remits computer system from the list identifying at least one remote computer system;
   (c) stopping the method when all remote computer systems have been previously selected from the list identifying at least one remote computer system;
   (d) sending a general response request to the selected remote computer system to determine whether the selected remote computer system can be contacted through the computer network, and transferring to step (b) if the selected computer system cannot be contacted;
   (e) determining whether the selected remote computer system allows remote performing of commands, and transferring to step (b) if the selected computer system does not support remote performing of commands;
   (f) remotely performing a command to list all other commands in the remote computer system and examining the list to determine whether the selected remote computer system contains all standard operating system commands necessary to install the software on the selected remote computer system, and transferring to step (b) if the selected computer system does not contain all the standard operating system commands;
   (g) remotely performing a command to list available disk space on the remote computer system and examining the list to determine whether the selected remote computer system contains an amount of free disk space required to install the software, and transferring to step (b) if the selected computer system does not have the amount of free disk space;
   (h) combining all individual files contained within the software into a single data stream;
   (i) transferring the single data stream to the remote computer system; and
   (j) separating the single data stream into the individual files to complete the installation.

2. The computer implemented method of claim 1 wherein step (a) further comprises the steps of;
   (a1) requesting a file containing the list identifying at least one remote computer system from the user of the method; and
   (a2) reading the list from the file.

3. The computer implemented method of claim 1 wherein step (a) further comprises the step of requesting identification of each remote computer system individually from the user of the method.

4. The computer implemented method of claim 1 wherein step (f) further comprises the step of:
   (f1) remotely performing a command to list a level of operating system software contained in the remote computer system, and transferring to step (b) if the level of operating system software is an incorrect level for the software being remotely installed.

5. The computer implemented method of claim 1 wherein step (f) further comprises the step of:
   (f1) remotely performing a command to list a type and level of electronics contained in the remote computer system, and transferring to step (b) if the type and level of electronics is incorrect for the software being remotely installed.

6. The computer implemented method of claim 1 wherein the combining of step (h) comprises concatenating the individual files together to form a single data stream.

7. The computer implemented method of claim 1 wherein step (i) further comprises the following step (i1) and wherein step (j) further comprises the following step (j1):
   (i1) transferring the single data stream to a temporary file in the remote computer system; and
   (j1) reading the single data stream from the temporary file and separating the single data stream into individual files to complete the installation.

8. The computer implemented method of claim 7 wherein the temporary file comprises a pipe.

9. A computer implemented method programmatically performed within a central computer system for installing software on a remote computer system by installing and updating a plurality of data files on the remote computer system through a computer network, the method comprising the steps of:

(a) requesting a list containing at least one remote computer system from a user of the central computer (b) selecting one previously unselected remote computer system from the list containing at least one remote computer system;

(c) stopping the method when all remote computer systems have been previously selected from the list containing at least one remote computer system;

(d) sending a general response request to the selected remote computer system to determine whether the selected remote computer system can be contacted through the computer network, and transferring to step (b) if the selected computer system cannot be contacted;

(e) determining whether the selected remote computer system allows remote performing of commands, and transferring to step (b) if the selected computer system does not support remote performing of commands;

(f) remotely performing a command to list all other commands in the remote computer system and examining the list to determine whether the selected remote computer system contains all standard operating system commands necessary to install the plurality of data files on the selected remote computer system, and transferring to step (b) if the selected computer system does not contain all the standard operating system commands;

(g) remotely performing a command to list available disk space on the remote computer system and examining the list to determine whether the selected remote computer system contains an amount of free disk space required to install the plurality of data files, and transferring to step (b) if the selected computer system does not contain the amount of free disk space;

(h) combining the plurality of data files into a single data stream;

(i) transferring the single data stream to the remote computer system; and (j) separating the single data stream into the plurality of data files to complete the installation.

10. The computer implemented method of claim 9 wherein step (a) further comprises the steps of;
(a1) requesting a file containing the list containing at least one remote computer system from the user of the method; and
(a2) reading the list from the file.

11. The computer implemented method of claim 9 wherein step (a) further comprises the step of requesting identification of each remote computer system individually from the user of the method.

12. The computer implemented method of claim 9 wherein step (f) further comprises the step of:
(f1) remotely performing a command to list a level of operating system software contained in the remote computer system, and transferring to step (b) if the level of operating system software is not correct for the plurality of data files being remotely installed.

13. The computer implemented method of claim 9 wherein step (f) further comprises the step of:
(f1) remotely performing a command to list a type and level of electronics contained in the remote computer system, and transferring to step (b) if the type and level of electronics is not correct for the software being remotely installed.

14. The computer implemented method of claim 9 wherein the combining of step (h) comprises concatenating the individual files together to form a single data stream.

15. The computer implemented method of claim 9 wherein step (i) further comprises the following step (i1) and wherein step (j) further comprises the following step (j1):
(i1) transferring the single data stream to a temporary file in the remote computer system; and
(j1) reading the single data stream from the temporary file and separating the single data stream into the plurality of data files to complete the installation.

16. The computer implemented method of claim 15 wherein the temporary file comprises a pipe.

* * * * *

UNITED STATES PATENT AND TRADEMARK OFFICE
CERTIFICATE OF CORRECTION

PATENT NO. : 5,421,009
DATED : May 30, 1995
INVENTOR(S) : Stephen M. Platt

It is certified that error appears in the above-indentified patent and that said Letters Patent is hereby corrected as shown below:

Col. 7, Claim 1, l. 47: After "1. A" add --computer implemented method,--

Col. 7, Claim 1, l. 54: Delete "remits" and insert therefor --remote--

Signed and Sealed this

Third Day of December, 1996

Attest:

BRUCE LEHMAN

Attesting Officer        Commissioner of Patents and Trademarks